No. 869,002. PATENTED OCT. 22, 1907.
J. F. MAGNUSON.
CUTTING TOOL.
APPLICATION FILED SEPT. 19, 1906.

WITNESSES:
Ell Such
Anthony Payne

INVENTOR
John F. Magnuson
BY
E. W. Marshall
ATTORNEY

UNITED STATES PATENT OFFICE.

JOHN F. MAGNUSON, OF YONKERS, NEW YORK.

CUTTING-TOOL.

No. 869,002.  Specification of Letters Patent.  Patented Oct. 22, 1907.

Application filed September 19, 1906. Serial No. 335,227.

*To all whom it may concern.*

Be it known that I, JOHN F. MAGNUSON, a subject of the King of Sweden, and a resident of the city of Yonkers, in the county of Westchester and State of New York, United States of America, have invented certain new and useful Improvements in Cutting-Tools, of which the following is a specification.

My invention relates to an improvement in cutting tools and its object is to provide a simple and efficient tool especially adaptable to the use of pattern makers and wood carvers and which possesses many advantages not found in other devices of this class.

I will describe my invention in the following specification and point out the novel features thereof in claims.

Figure 1:
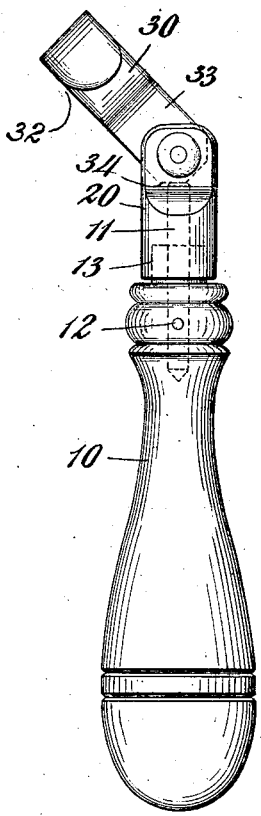
Figure 2:
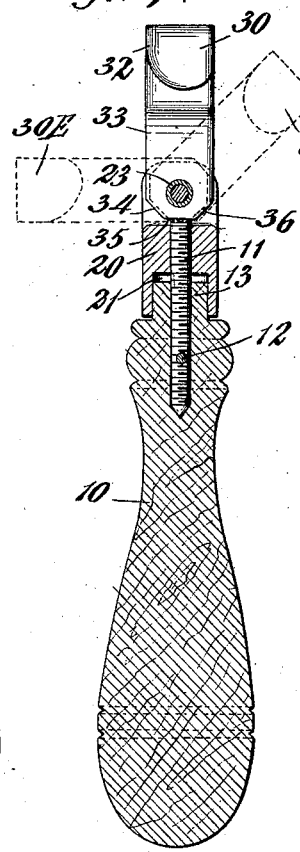
Figure 3:
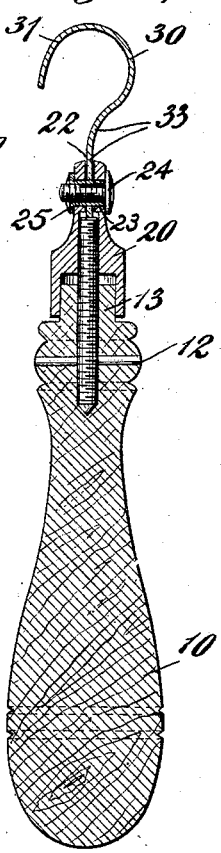
Figure 5:
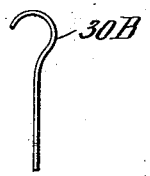
Figure 4:
Figure 6:
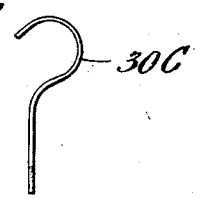

Referring to the drawings, Figure 1 is a side elevation of a tool made according to my invention. Fig. 2 is a sectional side elevation of the tool shown in Fig. 1, showing in dotted lines the cutter or blade in different positions. Fig. 3 is a sectional side elevation at right angles to that shown in Fig. 2, the section being taken through the line A—B of Fig. 2 and the view being taken in the direction of the arrows. Figs. 4, 5 and 6 are side elevations of different forms of cutters or blades which I use in connection with my invention.

Like characters of reference designate corresponding parts in all of the figures.

10 designates a handle of wood or other suitable material. A threaded shank 11 is placed in one end of this handle and securely locked thereto by a pin 12. This end of the handle is constructed to form a circular hub 13.

20 designates a metallic cap, one end of which is provided with a recess 21, which is arranged to fit over the hub 13 of the handle. The inside of this cap above this recess is provided with a threaded hole into which the threaded shank 11 may be screwed. The upper end of this cap 20 is slotted as shown at 22, and a hole 23 is drilled through it at right angles to this slot. A double screw, which comprises a male member 24 and a female member 25, is arranged to be placed through this hole.

A cutter or blade 30 of peculiar shape is shown in Figs. 1, 2 and 3. In these figures this blade is in the form of a thin semi-circular loop 31, which is sharpened on one edge which is shown in the drawings at 32. The other end of the cutter is provided with a straight flat shank 33. A hole is drilled through this portion of the cutter and is adapted to fit over the double screw 24, 25 as shown. The end of the shank 33 is provided with straight edges as shown at 34, 35 and 36 for a purpose which will appear hereinafter.

In Fig. 4 a blade 30$^A$ is shown, the shank portion of which is substantially like that already described, but the cutting portion of which is of a different shape.
Similarly, the cutters or blades 30$^B$ and 30$^C$, shown in Figs. 5 and 6, respectively, are provided with shank portions similar to that described in conjunction with the cutter 30, but the cutting portion or knife edges of which are of somewhat different shape.

Any one of the blades or cutters may be placed in the cap 20 by placing its flat shank within the slot 22 and then inserting the double screw 24, 25 through the holes in the cap and in the cutter which are provided for this purpose. One of the straight edges on the end of the shank of the cutter is brought opposite the threaded hole in the cap; for example, the edge 35 as shown in Fig. 2. The threaded shank 11 in the handle 10 is then screwed into this hole by turning the handle which presses the edge 34 which will cause the blade 30 to be securely locked in the handle in a position indicated by full lines in Fig. 2. If the straight edge 36 is brought opposite the threaded hole in the cap the blade or cutter will be held in the position shown at 30$^D$ in Fig. 2. The straight edge 34 may be brought opposite this threaded hole in which case the cutter will be held in the position in which it is shown in Fig. 1. It is also possible to hold the cutter at right angles to the handle in either direction. One of these positions is indicated by dotted lines at 30$^E$ in Fig. 2. Thus five operative positions for the cutter or blade are provided. Of course, the tool may be arranged so that the cutter may have more than five operative positions if desired by providing more than three straight edges at the end of the shank of the cutter in addition to the straight sides of the cutter shank.

This tool is especially designed for the use of pattern makers. It may be used in corners and in other close places which are difficult of access. It facilitates the work of cutting in such places and in fact provides a means for easily carving surfaces to which access is almost impossible by any of the tools commonly in use. The different positions in which the cutter may be held in the handle make it possible to accomplish with one tool the work for which many tools were formerly required. The angle between the cutting blade and its handle in some places affords means for getting a leverage or for twisting the tool to cut into small corners. By the use of several cutters of different forms its utility and general adaptability is increased.

What I claim is:—

1. In a pattern makers' carving tool, the combination of a handle, a screw permanently affixed thereto, a cap attached to the handle by said screw, and a thin curved cutting blade pivotally connected to the cap, the screw being arranged to lock the blade in the cap in any one of a plurality of operative positions.

2. In a pattern makers' carving tool, the combination of a handle, a screw permanently affixed thereto, a cap attached to the handle by said screw, said cap being constructed to form a slot at one end, a thin curved cutting blade adapted to be pivotally held within the slotted portion of the cap, the screw being arranged to lock the blade in the cap in any one of a plurality of operative positions.

3. In a pattern makers' carving tool, the combination of a handle, a screw permanently affixed thereto, a cap attached to the handle by said screw, said cap being constructed to form a slot at one end, a thin curved cutting blade adapted to be pivotally held within the slotted portion of the cap, said blade having a flat straight shank provided with a plurality of straight edges, the screw being arranged to lock the blade in the cap in any one of the plurality of operative positions by bearing upon one of said straight edges.

4. In a carving tool, the combination with a handle, a screw permanently affixed thereto, a cap attached to the handle by said screw, said cap being constructed to form a slot at one end, a second screw extending through the cap, and a blade adapted to be held within the slotted portion of the cap by said second screw, said blade having a curved cutting portion and a flat straight shank provided with a plurality of straight edges, the blade being arranged to be locked in the cap in any one of a plurality of operative positions by said first screw bearing upon one of said straight edges.

5. In a carving tool, the combination of a handle, a screw permanently affixed thereto, a cap provided with an internal threaded portion and arranged to be attached to the handle by said screw, said cap being constructed to form a slot at one end, a male and female screw extending through the cap at right-angles to the threaded portion of the cap, and a blade adapted to be held with the slotted portion of the cap by said male and female screw, said blade having a curved cutting portion and a flat straight shank provided with a plurality of straight edges, the blade being arranged to be locked in the cap in any one of a plurality of operative positions by said first screw bearing upon one of the straight edges.

In testimony whereof I have signed my name to this specification in the presence of two subscribing witnesses.

JOHN F. MAGNUSON.

Witnesses:
EDW. LUCH,
ERNEST W. MARSHALL.